Aug. 13, 1957  L. S. WILLIAMS  2,802,659
TARE DEVICE
Filed Sept. 22, 1953   2 Sheets-Sheet 1
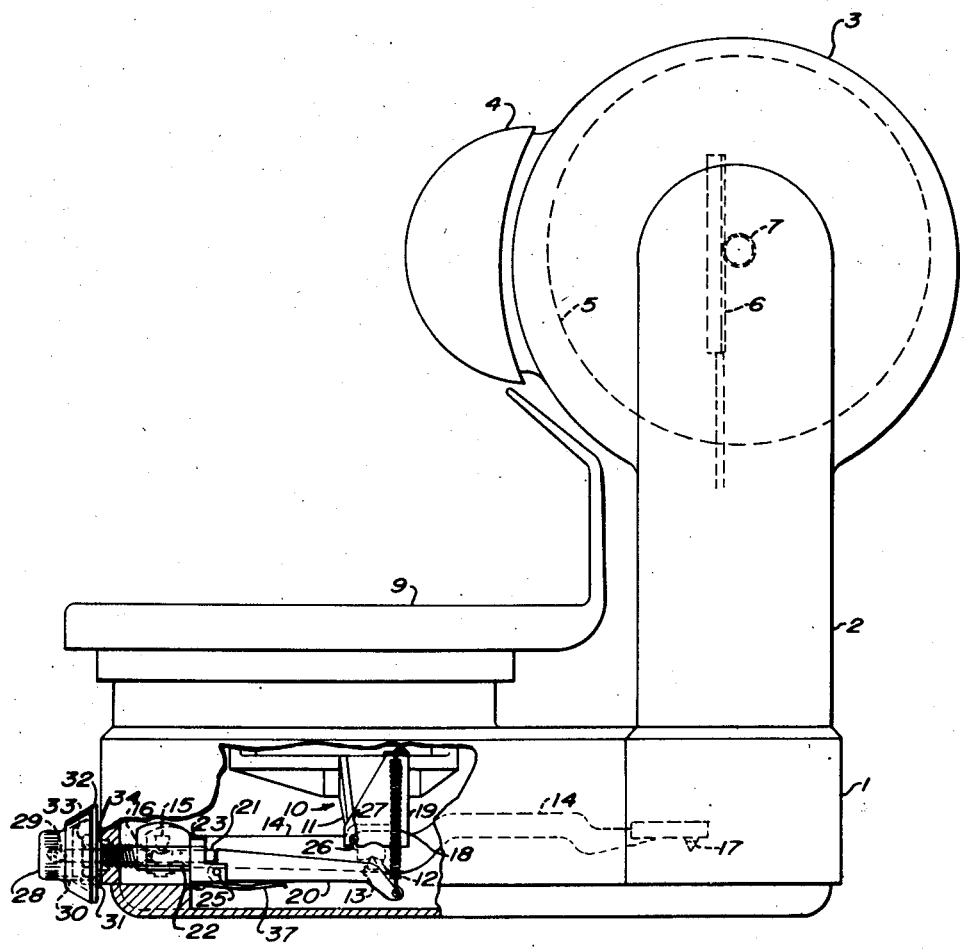
Fig. I
INVENTOR.
LAWRENCE S. WILLIAMS
BY
*Marshall, Marshall & Greeting*
ATTORNEYS Aug. 13, 1957  L. S. WILLIAMS  2,802,659
TARE DEVICE
Filed Sept. 22, 1953  2 Sheets-Sheet 2
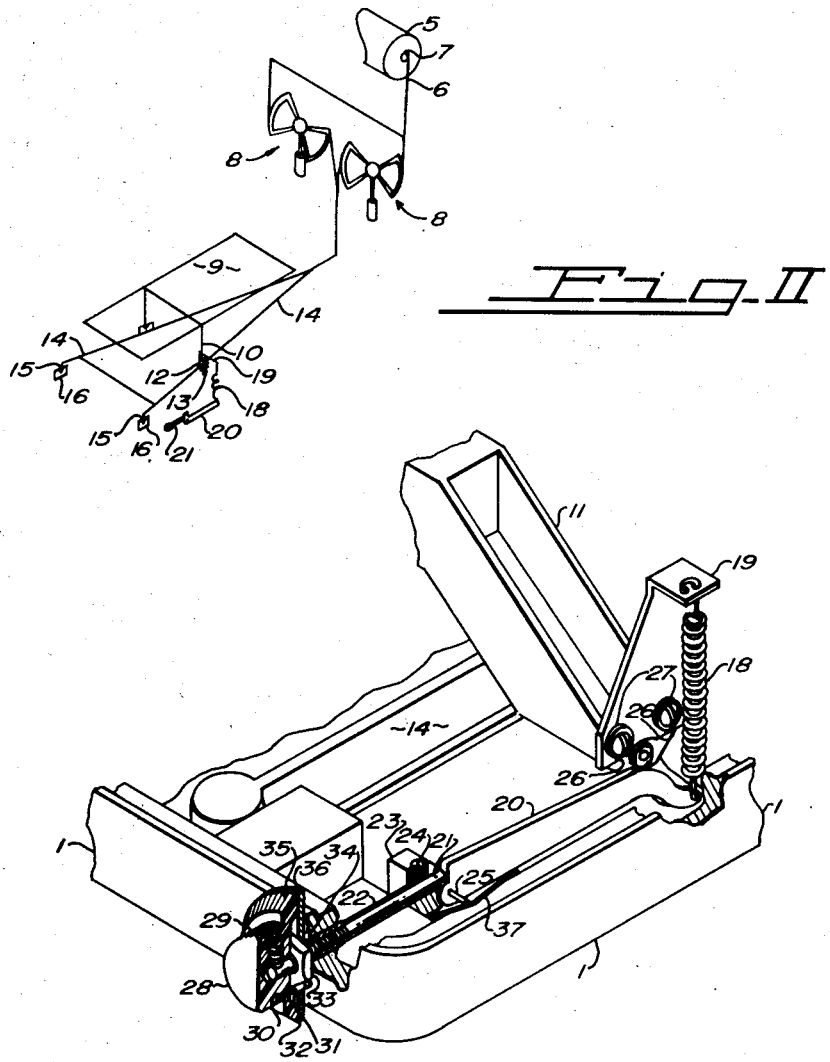
INVENTOR.
LAWRENCE S. WILLIAMS
BY
Marshall, Marshall & Yeasting
ATTORNEYS 2,802,659

Patented Aug. 13, 1957

2,802,659

TARE DEVICE

Lawrence S. Williams, Toledo, Ohio, assignor to Toledo Scale Company, Toledo, Ohio, a corporation of New Jersey Application September 22, 1953, Serial No. 381,717

2 Claims. (Cl. 265—63)

This invention relates to weighing scales and in particular to a tare offsetting device comprising an adjustable resilient member suspended from the spider of a weighing scale to preload the scale.

The compactness of design and the general construction of weighing scales intended for use in meat market and grocery store packaging makes it extremely difficult to incorporate any of the usual tare offsetting mechanisms, such as a tare beam and poise, so that the weight of a container or tare placed on the scale may be offset and the net weight indicated on the weighing scale chart. Furthermore, a tare beam and poise tare offsetting mechanism is undesirable because it does not provide dead adjustment, i. e. the force used to push the poise along the tare beam produces a moment or "live force" disturbing the condition of balance and effects indication of load. With such a "live force" tare offsetting device, it is necessary in setting off a tare load to move the poise to an approximate counterbalance position, to wait for the scale to come to rest, to note the indication and then to make another adjustment of poise position and again read the scale. This process is repeated until the proper position for the poise has been located and is so time consuming as to be impracticable for rapid packaging operations.

A tare offsetting mechanism providing dead adjustment permits very rapid adjustment for tare, since, in such a case, the weighing scale indicator is responsive only to the position of the tare weight and not to the force moving the weight. With such a system, one can watch the indicator of the scale and easily determine the remaining required movement of the tare weight as the weight is being moved into tare offsetting position.

Heretofore, a positionable weight has been mounted on the lever of a weighing scale in the hope of providing a tare offsetting system having dead adjustment. However, in such a device, the mechanism required to move the tare off-setting weight produces a moment tending to rotate the lever about its fulcrum and affects indication of load. This is true even though the mechanism required to move the tare off-setting weight is designed to produce a force in line with the fulcrum axis of the lever to eliminate such a moment, since it is impossible to produce and maintain an absolutely true alignment.

Adjustable weights have also been suspended from the load counterbalancing mechanism of weighing scales to provide a tare offsetting device having dead adjustment. However, the location of such weights causes great difficulty in controlling such a tare offsetting system.

An adjustable resilient member has been suspended from the lever of a weighing scale to preload the scale. Such a member, although providing dead adjustment, must be very rigidly attached or must be very freely attached to the lever in order to substantially eliminate friction. Either method of attachment is too expensive to be practicable, the latter requiring a special knife-edge and bearing.

The principal object of this invention is to provide, in a weighing scale, an easily controllable, inexpensive tare offsetting mechanism providing dead adjustment.

Another object of the invention is to provide, in a weighing scale, a tare offsetting mechanism to preload the load receiver of the scale and produce dead adjustment.

A still further object of the invention is to provide, in a weighing scale, a tare offsetting mechanism providing dead adjustment and which may be installed without modification of the weighing system.

More specific objects and advantages are apparent from the following description of a preferred embodiment of the invention.

According to the invention an improved tare offsetting device providing dead adjustment includes a resilient member engaging the load receiver of a weighing scale, means on the base of the scale for supporting the resilient member, and manually adjustable means for moving the support generally parallel to the path of the load receiver for varying the force transmitted through the resilient member.

A preferred embodiment of the invention is illustrated in the accompanying drawings.

In the drawings:

Figure I is an end elevational view of a weighing scale incorporating the improved tare offsetting device.

Figure II is a schematic view of a weighing scale incorporating the improved tare offsetting device.

Figure III is an enlarged isometric view of the tare offsetting device that appears in the broken away section of Figure I.

The specific drawings and the accompanying description are intended merely to illustrate the invention but not to limit its scope.

Referring to Figure I, a weighing scale embodying the invention includes a base 1, a column 2 erected from the rear portion of the base 1, a generally cylindrical chart housing 3 surmounting the column 2 and a tiltable frame 4 mounted on the forward portion of the cylindrical housing 3 for supporting a magnifying lens carrier in position such that indicia on a rotatable chart 5 may be viewed through the lenses in the carrier. The rotatable chart 5 is connected through a rack 6 and pinion 7 to load counterbalancing mechanism 8 (Figure II) that is contained within the colum 2 and is rotated through equal angles for equal increments of weight applied to a load receiving platter 9.

The load receiving platter 9 is carried on studs erected from a load spider 10 that has laterally extending arms 11 containing V-bearings 12 resting on load pivots 13 of a main lever 14. The spider 10 is of the type shown in detail in U. S. Patent No. 2,625,444 issued to N. E. Hart on Jan. 13, 1953. The main lever 14 includes fulcrum pivots 15 that are carried in V-bearings 16 set in the forward corners of the base 1. The main lever 14 is generally triangular in plan with the fulcrum pivots 15 located at the ends of the base of the triangle and a power pivot 17 located at the apex of the triangular shape and in position to transmit force to the load counterbalancing mechanism 8.

Referring to Figure II, in order that the weight of containers placed on the load receiving platter 9 may be offset and the weight of the net load in the container indicated on the chart 5, a resilient member or helical tension spring 18 is mounted on a bracket 19 rigidly attached to an arm of the spider 10 to preload the weighing scale. The spring 18 is supported by an adjustable bell crank arm 20 positioned by a manually operated adjusting screw or push rod 21 for moving the bell crank arm 20 generally parallel to the path of the load receiving platter 9 and to the path of the spider 10 for varying the force transmitted through the spring 18. The spring 18 is normally in extended position so that the force transmitted through the spring is offset by the load counterbalancing mechanism 8 when the chart 5 indicates zero net load. When a container is placed on the load receiving platter 9, the extension of the spring 18 is lessened by turning the push rod 21 counterclockwise so as to decrease the force transmitted through the spring 18 in an amount equal to the load force applied by the weight of the container.

The improved tare offsetting device provides dead adjustment, since the weighing scale indication is responsive only to the force transmitted through the spring 18 and not to the force applied through the push rod 21 and the bell crank arm 20 positioning the spring. With the improved tare offsetting device, one can watch the weighing scale indication and easily determine the remaining required movement of the push rod 21 as the spring 18 is being moved into tare offsetting position.

The tare offsetting device is easily controllable from outside the scale and is very inexpensive, since the device is simple and the spring 18 is attached through the bracket 19 to an arm of the spider 10, thus making use of the already present V-bearings 12 of the spider 10 and load pivots 13 of the main lever 14. If the spring 18 were directly attached to the main lever 14, an additional set of V-bearing and load pivots would have to be provided for the connection to substantially eliminate friction, or else the spring 18 would have to be very rigidly attached to the main lever 14. Either method of attachment to the lever would be expensive and impractical.

The tare offsetting device is shown in enlarged detail in Figure III. A threaded sleeve 22 extends through a drilled and tapped hole in a wall of the base 1 underlying the front portion of the load receiving platter 9. A hinge block 23 is rigidly mounted on the inner end of the sleeve 22 by means of a set screw 24 and carries the adjustable bell crank arm 20 which arm 20 is hinged on the block 23 and rotates about the axis of a hinge block pin 25. When the manually operated adjusting screw or push rod 21, which is threadedly inserted through the sleeve 22, is turned clockwise it advances and forces the bell crank arm 20 to rotate clockwise about the axis of the hinge block pin 25, i. e. generally parallel to the path of the load receiving platter 9 and to the path of the spider 10, to extend the helical tension spring 18 for varying the force transmitted through the spring 18. The force transmitted through the spring 18 preloads the scale, since the spring is mounted on the bracket 19 rigidly attached to the laterally extending arm 11 of the spider 10. The bottom of the bracket 19 includes two slots 26 arranged to slide beneath the heads of two screws 27 so that the bracket 19 may be attached or removed easily from the arm 11 of the spider.

When it is desired to make an adjustment of the spring 18, a knurled knob 28 held on the push rod 21 by means of a set screw 29 is turned in a direction to cause the push rod 21 to advance or retreat. A stop pin 30 carried by the knurled knob 28 cooperates with a screw 31 mounted on an index plate 32 rigidly held in place by a nut 33 against a spacer 34 set in a countersunk portion of the drilled and tapped hole through which the sleeve 22 extends. When the knurled knob 28 is turned counterclockwise until the stop pin 30 and the screw 31 engage, as shown in Figure III, the knob 28 can no longer be turned and an index notch 35 on the knurled knob 28 becomes aligned with an index notch 36 on the top of the index plate 32. To extend the spring 18, the knob 28 is turned clockwise to advance the push rod 21 to move the bell crank arm 20 in a path generally parallel to the path of movement of the weighing scale spider 10. When the knob 28 is turned clockwise as far as it can be turned, the stop pin 30 and the screw 31 engage, the spring 18 is in extended position and the force transmitted through the spring is offset by the load counterbalancing mechanism 8 when the chart 5 indicated zero net load. When a container is placed on the load receiving platter 9, the extension of the spring 18 is lessened by turning the knurled knob 28 counterclockwise so as to decrease the force transmitted through the spring 18 in an amount equal to the load force applied by the weight of the container.

In order to take backlash out of the tare offsetting adjusting mechanism, a spring member 37 is provided to force the bell crank arm 20 up against the push rod 21 to keep the system tight.

The knob 28 is knurled so that one can custom mark the knob at convenient index points. For example, if a grocer uses different size containers in his pre-packaging operations, it is convenient for him to index the knob 28 by placing a container on the load receiving platter 9, turning the knob 28 until the chart 15 indicates zero, and then marking with a pencil that portion of the knob 28 opposite the index notch 36 of the index plate 32. When changing from one size container to another, the knob 28 can be quickly turned to the pencil index mark which corresponds to the container now to be used.

This tare offsetting mechanism is easy to install in a weighing scale, since the only modification in the weighing scale structure that is required is the drilling and tapping of the hole through the wall of the base 1 to receive the threaded sleeve 22. The bracket 19 is easily installed by loosening the screws 27 and sliding the notches 26 under the heads of the screws.

Various modifications in the specific structure may be made without departing from the spirit and scope of the invention.

Having described the invention, I claim:

1. In a weighing scale, in combination, a base, a lever fulcrumed on the base, load counterbalancing mechanism operatively connected to the lever, a spider pivotally supported on the lever, and tare offsetting mechanism which provides dead adjustments and that includes a bell crank pivotally mounted on the base, a spring interconnecting the spider and the bell crank to preload the scale and means for positioning the bell crank, whereby the preload force transmitted through the spring may be decreased in an amount equal to a tare load force applied to the scale.

2. In a weighing scale, in combination, a base, a lever fulcrumed on the base, load counterbalancing mechanism operatively connected to the lever, a spider pivotally supported on the lever, and tare offsetting mechanism which provides dead adjustments and that includes a spring connected to the spider to preload the scale and means for positioning the spring, whereby the preload force transmitted through the spring may be decreased in an amount equal to a tare load force applied to the scale.

References Cited in the file of this patent

UNITED STATES PATENTS

| | | |
|---|---|---|
| 1,278,646 | Hem | Sept. 10, 1918 |
| 1,348,174 | Hem | Aug. 3, 1920 |
| 1,980,731 | Michener | Nov. 13, 1934 |
| 2,631,838 | Williams | Mar. 17, 1953 |
| 2,681,222 | Stelzer | June 15, 1954 |
| 2,731,255 | Stelzer | Jan. 17, 1956 |
| 2,739,806 | Stelzer | Mar. 27, 1956 |